July 30, 1968 R. G. HOLLINGER 3,394,717
CONTACT LENS CONTAINER
Filed Sept. 20, 1966 3 Sheets-Sheet 1
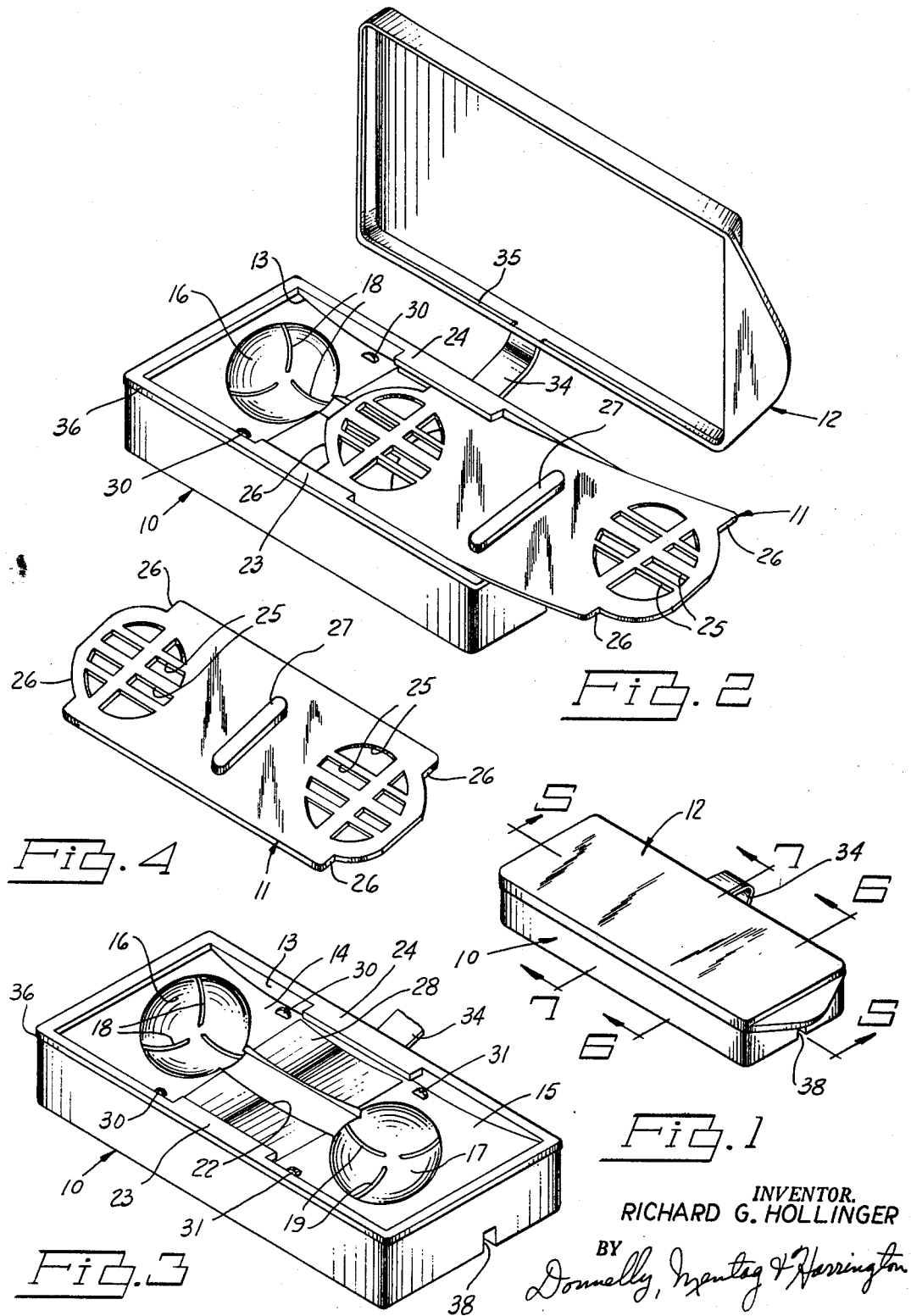
INVENTOR.
RICHARD G. HOLLINGER
BY
Donnelly, Mentag & Harrington
ATTORNEYS

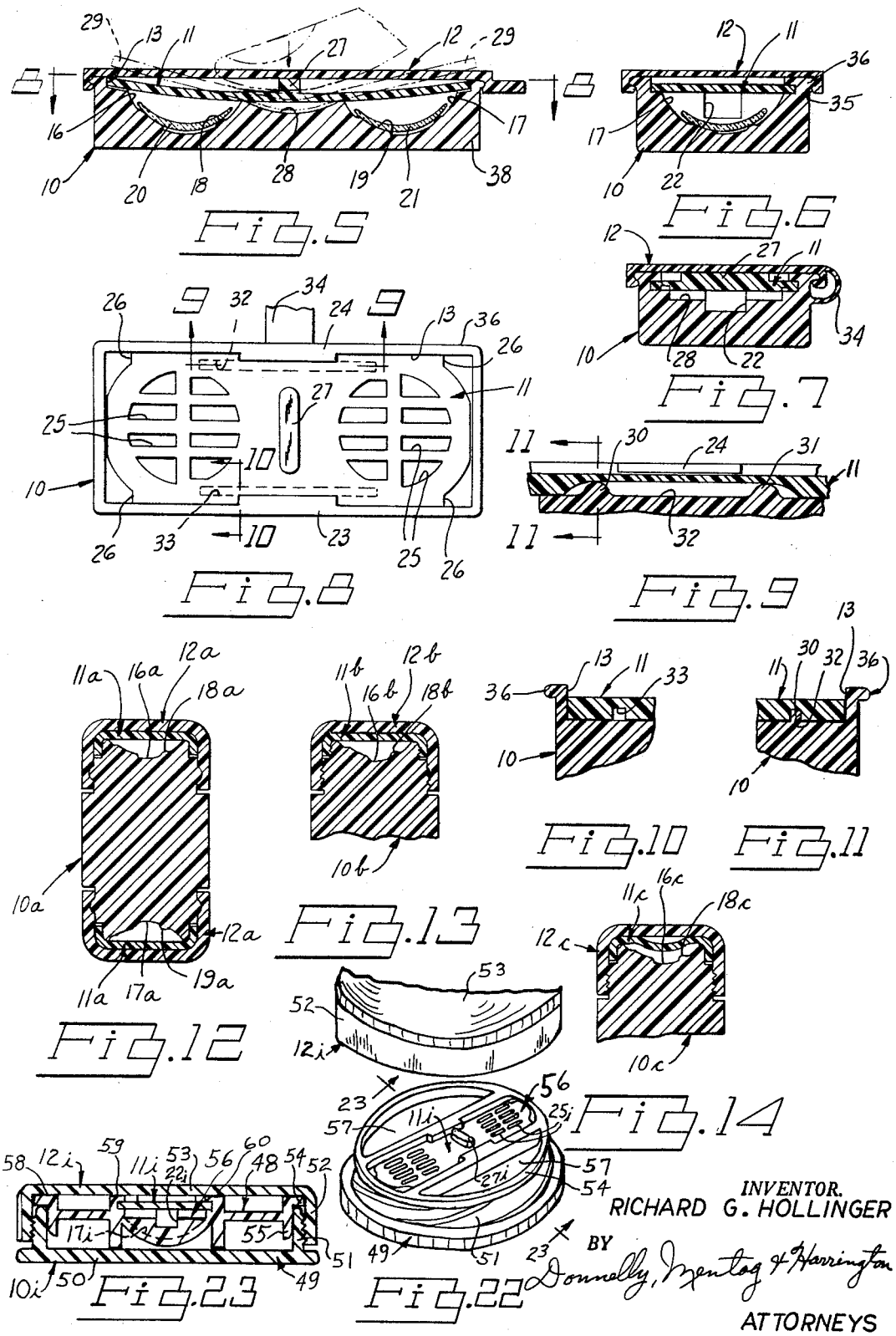

July 30, 1968 — R. G. HOLLINGER — 3,394,717
CONTACT LENS CONTAINER
Filed Sept. 20, 1966 — 3 Sheets-Sheet 3
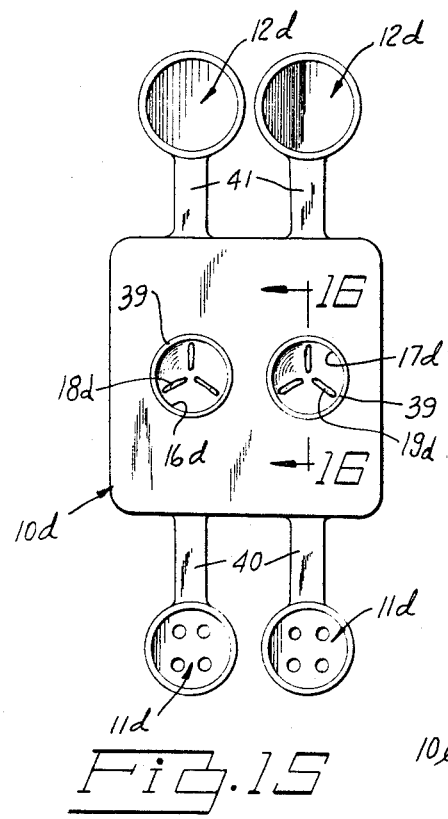
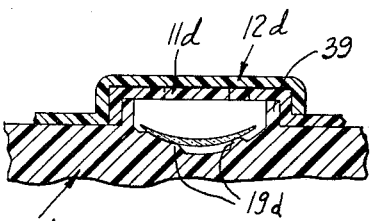
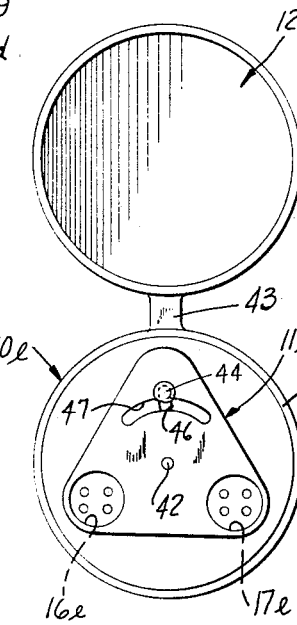
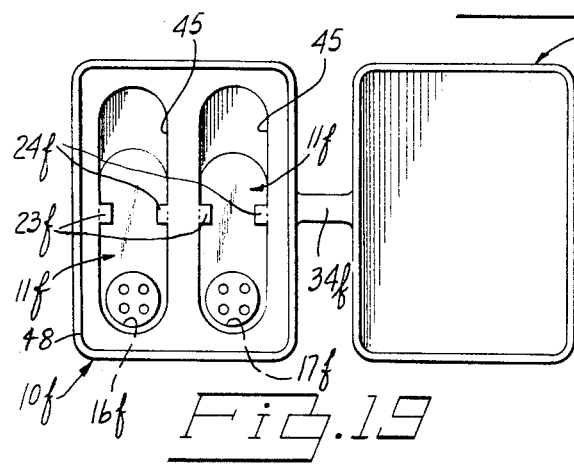
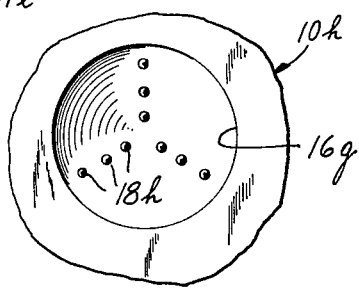
INVENTOR.
RICHARD G. HOLLINGER
BY Donnelly, Mentag & Harrington
ATTORNEYS

United States Patent Office 3,394,717
Patented July 30, 1968

3,394,717
CONTACT LENS CONTAINER
Richard G. Hollinger, 10745 Kingston,
Huntington Woods, Mich. 48070
Filed Sept. 20, 1966, Ser. No. 584,312
8 Claims. (Cl. 134—137)

This invention relates generally to the contact lens art and, more particularly, to an improved contact lens container.

One of the disadvantages of the prior art contact lens containers is that many of the users thereof do not take time to clean their containers and the result is that many of these containers become dirty with resultant adverse effects on the lenses stored in such containers. Other disadvantages of the prior art contact lens containers include the fact that they cannot be cleaned every time they are used for storage purposes and they cannot be used to rinse the lenses while in the container without diluting the solution in the container. Furthermore, some prior art contact lens containers are constructed so that the solution in the containers cannot cover the entire surfaces of the lens. A still further disadvantage of the prior art lens containers is that they provide lens support rings which adhere to the lenses, thereby requiring a sliding action to break the capillary attraction between the lens and the container with a resultant abrasive action on the lens and with warpage to the lens.

In view of the foregoing, it is an important object of the present invention to provide a novel and improved contact lens container which overcomes the aforementioned disadvantages of the prior art containers.

It is another object of the present invention to provide a novel and improved contact lens container which may be used for overnight storage, either with or without the contact lens solution and which may also be used for dry carrying or shipping purposes.

It is another object of the present invention to provide a novel and improved contact lens container which may be used for overnight storage of contact lenses with a minimum of solution and which can be used for rinsing the lens the next morning, whereby the lens container is cleaned every day and it is maintained in a continuous clean condition.

It is a further object of the present invention to provide a novel and improved contact lens container which is provided with noncontinuous suspension means in the lens chambers so that capillary attraction between the lens and the container is broken and the lens may be quickly and easily removed from the container without any sliding or abrasive action.

It is still another object of the present invention to provide a novel and improved contact lens container which is simple and compact in construction, economical to manufacture and efficient in operation.

It is still a further object of the present invention to provide a novel and improved contact lens container which comprises a base having a pair of concave lens holding chambers of a size to hold a sufficient amount of solution to assure that lenses stored in the chambers are completely covered, a screen means removably mounted over said chambers, and a cover for enclosing said chambers. The lens container is provided with a noncontinuous or three-point suspension means in each of said chambers for supporting a lens in such a manner that capillary attraction between the lens and the chamber is broken and deformation of the lens is eliminated. The noncontinuous suspension means comprises a three-point suspension means.

Other objects, features and advantages of this invention will be apparent from the following detailed description, appended claims, and the accompanying drawings.

In the drawings:

FIG. 1 is a perspective view of the first embodiment made in accordance with the principles of the present invention;

FIG. 2 is a slightly enlarged perspective view of the embodiment of FIG. 1, and showing the cover in an open position and the screen moved to an open position;

FIG. 3 is a slightly enlarged perspective view of the embodiment of FIG. 1, with the screen and cover removed;

FIG. 4 is a perspective view of the screen employed in the embodiment of FIG. 1;

FIG. 5 is a slightly enlarged, elevational section view of the structure illustrated in FIG. 1, taken along the line 5—5 thereof and looking in the direction of the arrows;

FIG. 6 is a slightly enlarged, elevational section view of the structure illustrated in FIG. 1, taken along the line 6—6 thereof, and looking in the direction of the arrows;

FIG. 7 is a slightly enlarged, elevational section view of the structure illustrated in FIG. 1, taken along the line 7—7 thereof, and looking in the direction of the arrows;

FIG. 8 is a top plan view of the structure illustrated in FIG. 5, taken along the line 8—8 thereof, with the cover removed, and looking in the direction of the arrows;

FIG. 9 is an enlarged, fragmentary, elevational section view of the structure illustrated in FIG. 8, taken along the line 9—9 thereof, and looking in the direction of the arrows;

FIG. 10 is a fragmentary, enlarged, elevational section view of the structure illustrated in FIG. 8, taken along the line 10—10 thereof, and looking in the direction of the arrows;

FIG. 11 is a fragmentary, elevational section view of the structure illustrated in FIG. 9, taken along the line 11—11 thereof, and looking in the direction of the arrows;

FIG. 12 is a sectional view of another embodiment of the invention;

FIG. 13 is a fragmentary section view of a slight modification of the structure of FIG. 12;

FIG. 14 is a fragmentary sectional view of a further modification of the structure of FIG. 12;

FIG. 15 is a plan view of another embodiment of the invention;

FIG. 16 is a fragmentary, elevational section view of the structure illustrated in FIG. 15, taken along the line 16—16 thereof, and showing the screen and cover in a closed position;

FIG. 17 is a plan view of still another embodiment of the invention;

FIG. 18 is a fragmentary view of the structure illustrated in FIG. 17, and showing the lock for the screen in an open position;

FIG. 19 is a plan view of still a further modification of the invention;

FIG. 20 shows a second type of three-point suspension means for use in the lens chambers;

FIG. 21 shows still another type of three-point suspension means for use in the lens chambers;

FIG. 22 is a perspectivie view, with parts in fragment and separated, of a further embodiment of the invention; and, FIG. 23 is an elevational section view of the structure illustrated in FIG. 22, taken along the line 23—23, and looking in the direction of the arrows.

Referring now to the drawings, and in particular to FIG. 2, the numeral 10 generally designates the base or body of the first illustrative embodiment of the invention.

The numeral 11 generally indicates a screen or grid member and the numeral 12 generally indicates a cover member.

As best seen in FIG. 3, the base 10 is provided with a compartment 13 having a pair of spaced apart bottom walls 14 and 15 in which are formed a pair of hemispherically shaped or concave shaped lens chambers 16 and 17. The base 10 is substantially rectangularly shaped in plan view and transverse view, and the chambers 16 and 17 are located at the opposite ends of the base 10. The chambers 16 and 17 are made to a size so as to hold a sufficient amount of lens soaking solution to assure that the lenses stored overnight in these chambers are completely covered. The chambers 16 and 17 are provided with a three-point, noncontinuous suspension means 18 and 19, respectively, which are adapted to hold the lenses in a position suspended above the bottom surface of the chambers 16 and 17. The three-point suspension members 18 and 19 break up any capillary attraction between the lenses and the surface of the chambers 16 and 17.

FIG. 5 shows a pair of contact lenses 20 and 21 positioned in the chambers 16 and 17 and partially supported by one of the three-point suspension members 18 and 19, respectively.

The illustrated three-point suspension members 18 and 19 are evenly spaced about the chambers 16 and 17 and they are integrally formed with the body 10. The suspension members 18 and 19 comprise straight, elongated ridges which extend upwardly from the chambers 16 and 17 a distance sufficient to break any capillary attraction between the lenses and the chamber surfaces. It has been found that the capillary attraction between lenses and the chambers may be broken up if the suspension members 18 and 19 extend upwardly at least .010″ from the bottom surface of the chambers 16 and 17. It will be seen that the suspension members 18 and 19 do not extend to a juncture point but have an opening between the inner ends thereof to permit free flow of fluids therebetween. As shown in FIG. 3, the chambers 16 and 17 are connected by a longitudinal passageway 22.

The screen or grid means 11 comprises and elongated flexible member which is adapted to be seated within the compartment 13 in the base 10 and to be in abutment with the side and end surfaces of the compartment 13 to retain the screen means 11 against endwise and sidewise movements. A pair of inwardly extended flanges 23 and 24 are integrally formed along the front and rear base 10 on the upper side thereof and extend over the screen means 11 for retaining the screen means 11 against outward movement.

As shown in FIGS. 2 and 4, the screen 11 is provided at each end thereof with a plurality of openings 25 which are adapted to be disposed over the chambers 16 and 17 when the screen 11 is in the closed position shown in FIGS. 5 and 8. The corners of the screen 11 are relieved, as indicated by the numeral 26 to permit free flow of fluid from the compartment 13 during a rinsing action, as described hereinafter. The screen 11 is provided with a finger member 27 for sliding the screen between the open and closed positions.

FIG. 5 illustrates the method of moving the screen 11 to the open position. As shown in FIG. 5, the user would press downwardly on the finger member 27 so as to move the central part of the flexible screen 11 downwardly into the concave portion 28 of the chamber 13 which is disposed between the compartments 16 and 17. This action flexes the ends of the screen 11 upwardly to the dotted line positions indicated by the numerals 29 whereby the screen 11 may be slid toward either end of the base 10 to uncover one or the other of the chambers 16 and 17 to permit the removal of the lens therefrom. One end of the compartment 13 is provided with a pair of spaced apart elevator members 30 and the other end of said compartment is provided with a similar pair of elevator members 31. The elevator members 30 and 31 are adapted to slide in the elongated, spaced apart slots 32 and 33 which are formed on the lower side of the screen 11. The members 30 and 31 coact with the screen to elevate the inner end thereof when the screen is slid to one end or the other to an open position.

As shown in FIG. 2, the cover 12 is connected to the base 10 by a flexible integral attachment arm 34. The cover 12 is provided with an inwardly extended lip 35 around the interior thereof which is adapted to be snapped over an outwardly extended lip 36 which is disposed about the periphery of the base 10. The base 10 is provided with a slot 38 on the right end thereof to indicate the right hand lens end of the base 10 which would be the end of the base 10 that contains the chamber 17. It will be understood that the base 10, the screen 11 and the cover 12 may be made from any suitable material, as for example, polyethylene plastic.

It will be understood that the self cleaning container of the present invention may be used for dry shipping purposes or for overnight wet or dry contact lens storage purposes. The chambers 16 and 17 are made to a size which will hold a sufficient solution to completely cover the lens contained therein without wasting solution. After the slide is moved to the open position, the user may quickly and easily remove a lens from one of the chambers by touching the lens very lightly with the index finger. It is not necessary to slide the lens from the suspension means 18 and 19 as in the prior art devices. If a wet storage has been used, the lenses are first rinsed before removing the same from the container. The lenses may be rinsed before removing them from the container by merely opening the cover and holding the container under a water tap to permit free flow of water through the openings in the screen member 11.

It will be seen that when the container is used as a wet storage device, that the solution can be used only once and that it cannot be overloaded with bacteria. It will also be seen that the container itself is cleaned every day thereby promoting a clean storage container. It will also be seen that the three-point suspension means in the chambers are arranged in such a manner so that capillary attraction between the lens and the chamber surfaces is broken so as to avoid the tendency to shape the lens to the lens chamber and to make the removal of the lenses easier. The chambers 16 and 17 may hold lenses of any curvature or diameter.

FIG. 12 shows a sectional view of another embodiment of the invention in which the base has been formed in the shape of a cylinder with the chambers 16 and 17 mounted at the opposite ends thereof. The parts of this embodiment which are the same as the parts of the first embodiment have been marked with the same reference numerals followed by the small letter *a*. In this embodiment, the chambers 16*a* and 17*a* have been enclosed by a pair of cylindrical cover members 12*a* which are snapped in place on the ends of the base 10*a*. The screen members 11*a* are also snapped in place over the chambers 16*a* and 17*a*. The embodiment of FIG. 12 provides all of the advantages of the embodiment of FIGS. 1 through 11 of providing a clean container with a minimum of useage of soaking solution and with the ability of rinsing the lenses in position in the chambers 16*a* and 17*a*.

FIG. 13 shows a slight modification of the embodiment of FIG. 12. In the modification of FIG. 13, the cover 12*b* is shown as being threadably mounted on the base 10*b* and the screen 11*b* is threadably mounted on the base 10*b*. It will be understood that both ends of the base 10*b* would be enclosed by similar covers 12*b*.

FIG. 14 shows a further modification of the structure of FIG. 12. In this embodiment, the screen 11*c* is snapped in place over the chamber 16*c* and the cover 12*c* is threadably mounted in place. The screen 11*c* is provided with a concave inwardly directed portion to provide a more efficient retaining of the lens in the chamber 16*b*.

FIG. 15 is a plan view of another embodiment of the invention and the parts of this embodiment which are the same as the parts of the embodiment of FIGS. 1 through 11 have been marked with the same reference numerals followed by the small letter *d*. The base 10*d* is substantially square in plan view and each of the chambers 16*d* and 17*d* are provided with a circular flange 39 around the periphery thereof. The container of FIG. 15 is provided with a pair of screens 11*d* which are connected by the integral flexible arms 40 to the base 10*d* and which are adapted to be snapped over the chamber flanges as shown in FIG. 16. The embodiment of FIG. 15 further includes a pair of cover members 12*d* which are connected by the integral flexible arms 41 to the base 10*d* and which are adapted to be snapped into position over the screen 11*d*, as shown in FIG. 16. The embodiment of FIGS. 15 and 16 is adapted to function in the same manner as the embodiment of FIGS. 1 through 11.

FIG. 17 shows a plan view of another embodiment of the invention and the parts thereof which are the same as the parts of the first embodiment of FIGS. 1 through 11 have been marked with the same reference numerals followed by the small letter *e*. In this embodiment, the base 10*e* is circular in cross section and the screen 11*e* is adapted to be pivoted over the compartments 16*e* and 17*e* by means of a pivot pin 42. A single cover 12*e* connected by an integral flexible arm 43 is adapted to be snapped over the peripheral flange 45 and enclose the upper end of the base 10*e*. The screen 11*e* is locked in the closed position shown in FIG. 17 by means of the movable lock pin 44 which is adapted to be moved in the slot 46 in the base 10*e* from the locked position shown in FIG. 17 to the open position shown in FIG. 18, to permit rotation of the screen 11*e* by means of the arcuate slot 47 either in a clockwise or counterclockwise direction to provide access to the chambers 16*e* and 17*e*.

FIG. 19 shows a plan view of still a further embodiment of the invention in which the parts thereof are marked with the corresponding reference numerals of the first embodiment of FIGS. 1 through 11, followed by the small letter *f*. In this embodiment, the chambers 16*f* and 17*f* are enclosed by a screen means which comprises a pair of slide members 11*f* that are slidably mounted in a pair of spaced apart slots formed in the upper surface of the base 10*f*, as indicated by the numerals 45. The upper side of the base 10*f* is enclosed by a cover 12*f* in the same manner as in the first embodiment and which snaps over the peripheral flange 48. The screens 11*f* are slid forwardly and backwardly between the open and closed positions to provide access to the chambers 16*f* and 17*f*.

FIG. 20 illustrates a second form of three-point suspension means. Suspension members 18*g* are formed in the same manner as the elongated suspension members 18, but instead of being straight, they are formed as arcs.

FIG. 21 shows a further type of three-point suspension means which comprises a plurality of raised dots or pimples 18*h* which are disposed in three separate lines that are spaced evenly, radially and circumferentially about the chamber 16*h*.

FIGS. 22 and 23 show another embodiment of the invention in which the base has been made in two parts instead of an integral, singular part. As best seen in FIG. 23, the base of this embodiment is generally indicated by the numeral 10*i*, and it comprises the first or upper portion 48 which is carried in the second or lower portion 49. The base first portion 48 may be secured in the second portion 49 by any suitable means, as by a press fit. The base 10*i* is enclosed by the threadably mounted cover 12*i*. In this embodiment, the base 10*i* and cover 12*i* are circular in configuration, and the base upper portion 48 is provided with the pair of concave lens holding chambers enclosed by a screen means 11*i*, in substantially the same manner as the first embodiment of FIGS. 1 through 9. The base 10*i*, cover 12*i* and screen 11*i* of this embodiment may be made from any suitable material, as for example, they may be molded from a suitable plastic.

It will be understood, that the other embodiments shown in FIGS. 1 through 21 may also be made from any suitable material, as for example, they may be molded from a suitable plastic.

The base second portion 48 of the embodiment of FIGS. 22 and 23 includes the circular bottom wall 50 which is provided with the integral, upwardly extended circular side wall 51. The side wall 51 is provided on the outer face thereof with suitable threads for engagement with the threads on the inner side of the side wall 52 of the cover 12*i*. The cover 12*i* further includes the top wall 53 which is integral with the side wall 52.

As shown in FIGS. 22 and 23, the base first portion 48 includes the circular wall 54 which is seated on the upper end of the circular side wall 51 of the second base portion 49. The lower end 55 of the circular wall 54 is offset inwardly and engages the inner face of the base second portion side wall 51. The numeral 56 indicates an assembly integrally formed within the circular wall 54 and which includes the pair of concave lens holding chambers and the screen 11*i* in the same manner as the first embodiment of FIGS. 1 through 9. The space between the assembly 56 and the circular wall 54 is enclosed by the horizontal walls 57 which are disposed below the upper edge of the circular wall 54, and which provide spill chambers for any fluid which may spill accidentally from the concave lens holding chambers. The embodiment of FIGS. 22 and 23 functions in the same manner as the embodiment of FIGS. 1 through 9. The parts of the embodiment of FIGS. 22 and 23 which are the same as the embodiment of FIGS. 1 through 9 are marked with the same reference numerals, followed by the small letter *i*. The inner surface of the cover 12*i* engages with and seals against the upper face 58 of the circular base wall 54, and the surfaces 59 and 60 of the assembly 56. The inner face of the base wall 51 also engages with and seals against the outer face of the base wall 55.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:
1. A contact lens container, comprising:
 (a) a base having a pair of concave lens holding chambers of a size to hold a sufficient amount of solution to assure that lenses stored in the chambers are covered completely;
 (b) screen means removably mounted over said chambers;
 (c) noncontinuous suspension means in each of said chambers for supporting a lens in such a manner that capillary attraction between the lens and chamber is broken, said suspension means comprising a three-point suspension means; and
 (d) cover means for enclosing said chambers.

2. A contact lens container as defined in claim 1, wherein:
 (a) said screen means is slidably mounted over said chambers.

3. A contact lens container as defined in claim 1, wherein:
 (a) said screen means has a portion concavely shaped and adapted to extend downwardly into said chambers.

4. A contact lens container as defined in claim 1, wherein:
 (a) said screen means is rotatably mounted over said chambers.

5. A contact lens container as defined in claim 1, wherein:
 (a) said screen means is snapped in place over said chambers.

6. A contact lens container as defined in claim 1, wherein:
   (a) said screen means is threadably mounted over said chambers.

7. A contact lens container as defined in claim 1, including:
   (a) means for locking said screen means in place over said chambers.

8. A contact lens container as defined in claim 1, wherein:
   (a) said base comprises a first portion carried in a second portion; and,
   (b) said pair of concave lens holding chambers are formed in said first portion.

References Cited

UNITED STATES PATENTS

| | | | |
|---|---|---|---|
| 3,035,589 | 5/1962 | King | 206—5 XR |
| 3,089,500 | 5/1963 | Stalcup | 206—5 XR |
| 3,139,097 | 6/1964 | Hungerford et al. | 134—145 |
| 3,279,482 | 10/1966 | Hungerford et al. | 134—145 |

ROBERT L. BLEUTGE, *Primary Examiner.*